T. B. STEWART.
FUME CONDENSER.
APPLICATION FILED JAN. 6, 1917.
1,252,731. Patented Jan. 8, 1918.
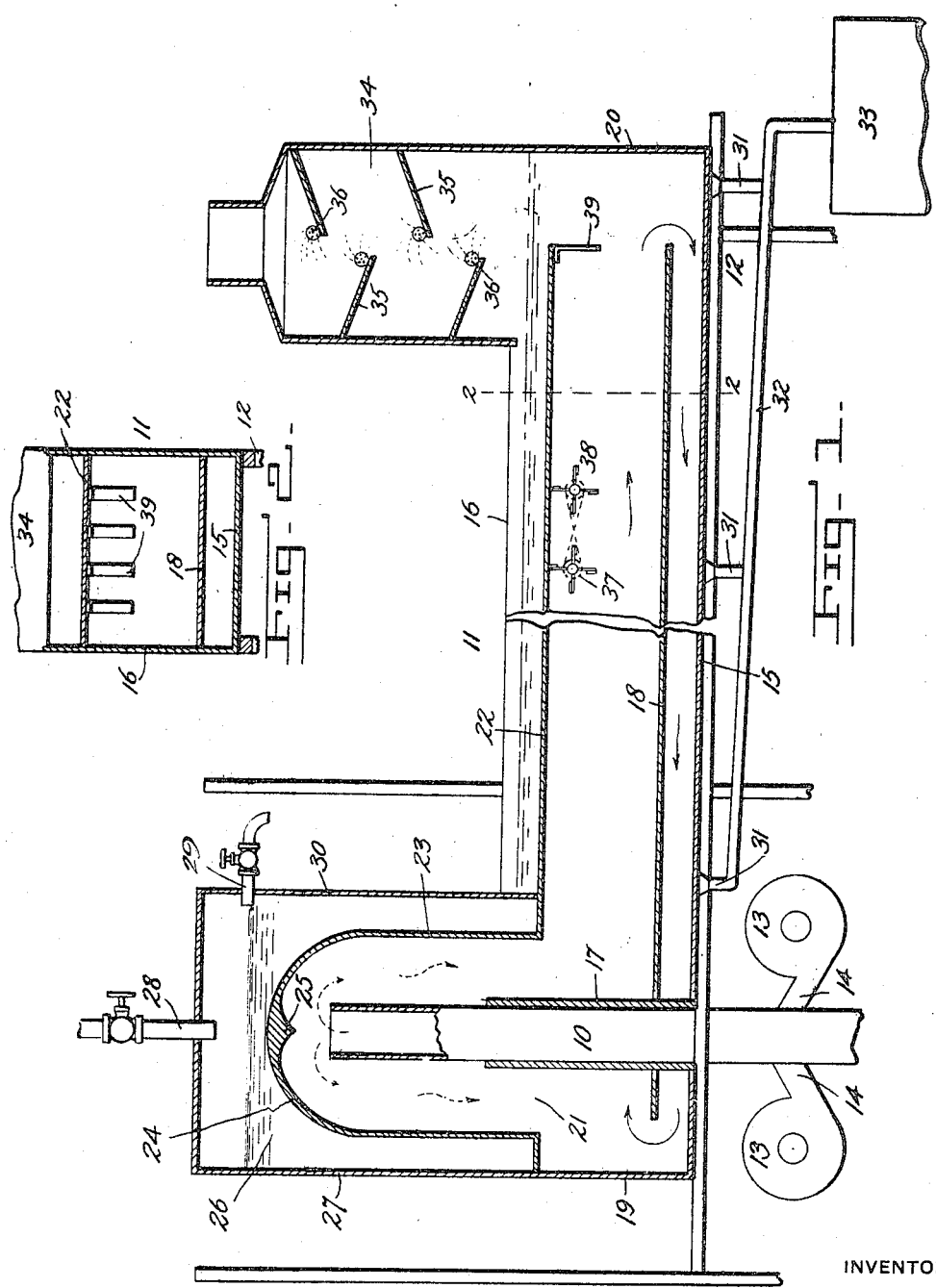
INVENTOR
Thomas B. Stewart
WITNESSES
ATTORNEY

UNITED STATES PATENT OFFICE.

THOMAS B. STEWART, OF PORTOLA, CALIFORNIA.

FUME-CONDENSER.

1,252,731. Specification of Letters Patent. Patented Jan. 8, 1918.

Application filed January 6, 1917. Serial No. 140,987.

*To all whom it may concern:*

Be it known that I, THOMAS B. STEWART, a citizen of the United States, residing at Portola, in the county of Plumas and State of California, have invented certain new and useful Improvements in Fume-Condensers, of which the following is a specification.

This invention relates to an apparatus for condensing smoke and the gaseous products passing from chimneys and more particularly relates to a fume condensing apparatus designed to be applied to smelters.

The principal object of the invention is to provide an efficient apparatus for suppressing by condensation in water the deleterious gases given off in the fumes and smoke arising from smelters and like furnaces and also for collecting all metalliferous solid matters or values resulting from such condensation.

Another object of the invention is to provide such a fume condensing apparatus with means in the form of a long tank filled with water and fitted with baffle or collecting plates, through which all smoke and gases from one or more smelters are forced by pressure, and in passing through the water in the said tank all gaseous metals are condensed and fall upon the baffle plates and bottom of the tank and carried from them by the current of water that flows continuously from the tank through outlet pipes to a settling tank. All other condensable substances are precipitated as solids or carried off in solution in the water and relatively pure air only escapes from the apparatus.

A further object of the invention is to provide in connection with the aforesaid condensing means, of a low chimney or flue rising from the end of the tank containing baffle plates and water sprays to insure the precipitation and condensation of any gaseous substances or smoke that escapes from the tank without being acted on.

With the above as the principal objects in view, the invention consists of the novel features of construction, combination and arrangement of parts hereinafter described, pointed out in the claims and illustrated in the accompanying drawings in which:

Figure 1 is a vertical longitudinal sectional view of the apparatus applied to the stack of a smelter furnace, and Fig. 2 is a cross sectional view on the line 2—2.

In the drawings, 10 indicates the upper end of a stack or outlet flue from a smelter, said upper end entering the condensing apparatus 11 mounted upon a suitable framework 12. A forced draft through the stack 10 is superinduced by a plurality of rotary fans 13, the upwardly inclined spouts 14 of which enter through the sides of the stack and force the gaseous products passing therethrough out of the upper end under a greater or lesser pressure as desired.

The stack 10 passe upwardly through the bottom 15 of a long horizontal tank 16, the stack being at one end of said tank and is surrounded by a jacket 17 that fits tightly against the exterior of the stack and prevents the escape of any gaseous products therebetween, the jacket 17, being understood, projects a short distance above the top of the tank to protect the stack from contact with water in the tank. A short distance above the bottom 15 of the tank, is a horizontal baffle plate 18 that extends from end to end of the tank, a slight space separating the extreme ends of the baffle plate from the end walls 19, 20 of the tank. A second baffle plate a short distance below the top of the tank extends from and is connected to the end 19 of the tank to the opposite end of the tank terminating vertically above the like end of the baffle plate 18. These baffle plates extend across the tank and are riveted to the sides thereof. The bottom baffle plate 18 has an opening formed therein sufficiently large to permit the passage therethrough of the jacket 17. a larger opening 21 is however made in the upper baffle plate 22 concentric with the stack 10. Supported upon the baffle plate 22 is an upright cylindrical cap 23 the lower open end of which coincides with the opening 21 in said baffle plate while the upper end is closed with a hemispherical top 24 that curves above the upper open end of the stack 10 and has projecting downwardly from its inner side a depending finger 25, the sides of which have a concave curvature that extends outwardly and gradually merges into the curvature of the top 24. By means of the construction just described, smoke and heated gases forced out of the stack 10 are caused to turn downwardly and pass from the cap 23 through the bottom thereof and opening 21 in the baffle plate 22.

Surrounding the cylindrical cap 23 and extending above the top of the same is an upright tank or reservoir 26 spaced from the vertical sides of the cap 23 and which may be cylindrical, square or other form. The outer wall 27 is preferably continuous with the side 19 of the tank 16, the opposite wall however rises from the top of the upper baffle plate 22. The top of the reservoir 26 may be open or partly open as shown, and into the same there projects a pipe 28 for delivering water into the reservoir from any convenient source of supply. Near the top of the reservoir 26 is an outlet pipe 29 that projects through the wall 30 of the reservoir at a point above the top of the cap 23 so that water in the reservoir will always rise above the hemispherical top 24 of the cap before it escapes through the outlet 29.

Extending downwardly from the bottom 15 of the main tank 16 are a number of pipes 31 opening into the tank and all connected to an incline conduit 32, the end of which opens into a settling tank 33.

Rising from the tank 16 at the end 20 is a low flue or chimney 34 in which are arranged a number of baffle plates 35 connected to opposite sides of the flue or chimney and alternating with each other, being inclined downwardly toward the center line of the flue, the length of the plates being such as to form a zig zag passage upwardly through the chimney. On the end of each plate is a pipe 36 perforated as shown to cause water forced through said pipe to escape therefrom in the form of spray, as shown.

Under the baffle plate 22 at a suitable point in the length of the tank 16 are arranged two paddle wheels 37 and 38 connected together by a cross belt passing over pulleys outside the tank and driven by any suitable power for the purpose of agitating the water in the tank and breaking up any bubbles of gases that may be held in suspension in the water. At the end of the baffle plate 22 below the chimney or flue 34, are secured a number of downwardly projecting fingers 39 that also serve to break up the gaseous bubbles as they are carried below the baffle plate 22 by the current of the water.

In operating the apparatus, water from the pipe 28 fills the reservoir 26 to the level of the outlet pipe 29, this height being sufficient to entirely submerge the whole of the cap 23 thus providing a cooling envelop therefor. Water flowing continuously into the reservoir escapes through pipe 29 and falls into horizontal tank 16 upon the upper baffle plate 22 filling said tank to a height somewhere between the top of the tank 16 and the upper baffle plate 22 being maintained at this height by the outflow through the pipes 31 and conduit 32, suitable means such as valves being provided to regulate the inflow of water through pipe 28 and from outlet 29 to maintain this level.

The gaseous products from the smelter pass upward through the flue 10 by natural draft and the forced draft of fans 13 and emerging from the top of said stack are deflected by the hemispherical top 24 of the tank 23 downwardly through said cap and below the baffle plate 22 toward the opposite end of the tank. Here the gases or the majority of them that have escaped condensation pass upwardly beyond the end of the baffle plate 22 into chimney 34 and out through the top thereof. These gases which by this time have been cooled by the water and consist mainly of air are deflected back and forth by the baffle plates 35 and brought into contact with the sprayed water from the pipes 36 will be almost entirely freed of all condensable substances.

The outflow of water from the tank 16 through pipes 31 causes the water within said tank to flow in the direction indicated by the solid arrows, the water above the baffle plate 22 and between said plate and the lower plate 18 moving toward the end 20 of the tank while all water below the baffle plate 18 is forced to travel in the opposite direction, that which fails to pass out through the pipes 31 passing to the end 19 of the tank and again above the plate 18. The heated gases under pressure are forced downwardly and out of the cap 23 as shown by the dotted arrows to the end 20 of the tank and up through the chimney 34, being broken up as they pass from end to end of the tank and such substances as are condensable are cooled by the water and either remain in solution therein to be carried off by the water or if insoluble to be precipitated on the baffle plates and bottom of the tank and finally carried off by the current of water through pipes 31 and conduit 32 into the settling tank 33. Any large bubbles of gas which naturally will pass along the under side of the upper baffle plate 22 will encounter the paddle wheels 37 and 38 and be broken up by the rotation of said paddles.

What is claimed is:

1. A fume condenser comprising a horizontal tank having an outlet at the bottom thereof, spaced horizontal partitions in said tank, means regulating the inflow of water to the tank for maintaining a level thereof above the partitions, means for causing said water to flow through the tank and around the lower partition in oppositely directed currents, and means for forcing heated gaseous substances into and through the water between the partitions.

2. In a fume condenser, a horizontal tank having upper and lower horizontal partitions extending from end to end thereof, a cylindrical cap at one end of the upper partition opening downwardly therethrough, means for introducing heated gases into said cylindrical cap, an inlet for water opening into said tank above the upper partition, and a reservoir of water surrounding said cap.

3. A fume condenser comprising a horizontal tank, upper and lower horizontal partitions in said tank and extending from end to end thereof, a cylindrical cap projecting upwardly from the upper partition near one end of the tank, means for introducing heated gases into said cap, a chimney at the opposite end of said tank projecting over the ends of the partitions at the same end, means for filling the tank with water and maintaining the same in a filled condition, and outlets through the bottom of the tank for said water whereby a current through said tank in opposite directions is created.

4. A fume condenser comprising a horizontal tank, upper and lower partitions in said tank horizontally disposed and spaced apart and extending from end to end of the tank, a cap extending upwardly from the upper partition at on end of the tank, means for introducing the gaseous products from a smelter into said cap near the top thereof, a chimney rising from the tank at the opposite ends and opening into said tank above the ends of the upper and lower partitions, baffle plates in said chimney, water sprays at the end of each baffle plate, and means for filling said tank with water and causing the same to travel from end to end of the tank in oppositely directed currents.

In testimony whereof I affix my signature in presence of two witnesses.

THOMAS B. STEWART.

Witnesses:
E. B. HENSEL,
CLARA FIRMSTONE.

Copies of this patent may be obtained for five cents each, by addressing the "Commissioner of Patents, Washington, D. C."